United States Patent [19]
Zhu

[11] Patent Number: 5,577,188
[45] Date of Patent: Nov. 19, 1996

[54] METHOD TO PROVIDE FOR VIRTUAL SCREEN OVERLAY

[75] Inventor: Min Zhu, Los Altos, Calif.

[73] Assignee: Future Labs, Inc., Los Altos, Calif.

[21] Appl. No.: 252,791

[22] Filed: May 31, 1994

[51] Int. Cl.⁶ .................................................. G06F 3/14
[52] U.S. Cl. ............................... 395/326; 395/339
[58] Field of Search ................................ 395/157, 160, 395/161, 158, 164, 650; 345/201; 364/419.1

[56] References Cited

U.S. PATENT DOCUMENTS

| | | | |
|---|---|---|---|
| 5,047,760 | 9/1991 | Trevett et al. | 345/201 |
| 5,146,592 | 9/1992 | Pfeiffer et al. | 395/157 |
| 5,231,578 | 7/1993 | Levin et al. | 364/419.1 |
| 5,245,702 | 9/1993 | McIntyre et al. | 395/164 |
| 5,432,932 | 7/1995 | Chen et al. | 395/650 |

*Primary Examiner*—Mark R. Powell
*Assistant Examiner*—Ruay Lian Ho
*Attorney, Agent, or Firm*—Claude A. S. Hamrick; Emil C. Chang

[57] ABSTRACT

The present invention in the form of a computer software program provides for a method for annotating over static images or annotating over active application programs. In the case of static images, user-created objects can be created, manipulated and placed over static images. In the case of annotating over application programs in a structured system environment such as in a windows environment, an overlay program embodying the present invention provides an overlaying method allowing the user to switch back and forth between the active application programs and the overlay program. When the overlay program has control, a screen-size, transparent window is created and annotations are created in this window. This transparent window allows the user to see the application programs on the screen. Thus, when creating annotations on this window, a visual perception is created that the annotations are on the images displayed by the application programs. When the user finishes annotating, the user can switch back to the active application programs with the option to hide the annotations or to display the annotations over the active application programs.

24 Claims, 8 Drawing Sheets

METHOD TO PROVIDE FOR VIRTUAL SCREEN OVERLAY

BACKGROUND OF THE INVENTION

1. Field of the Invention

This invention generally relates to displaying of objects on a computer screen and more particularly to a method of organizing and displaying user created or imported objects over active application programs or static images.

2. Background of the Invention

Whenever two or more people are involved in the preparation of a document, whether it be a financial spread sheet, a CAD design, a circuit schematic layout, an organization report, a bit map image, etc., succeeding drafts of the document are prepared, circulated, modified in the process. Each person annotates his or her remarks on the document and forwards it to the next person. Typically, several drafts of the document will be circulated before a final draft is produced, and this is a very time consuming process.

In the case where a person involved in this document preparation process is at a different geographical location, getting the document from one location to another location and back becomes another tedious and time consuming task. The document will either have to be mailed or faxed to that person, further complicating the entire process.

One standard method to alleviate this process is to hold meetings where everyone gathers and comments on the document with the hope to reduce the number of drafts needed before a final draft is produced. The shortcoming with this method is that there may be significant travel time and travel cost in getting all of the people to the same location. In addition, the final draft of the document usually is again circulated for final comments.

One solution to solve this problem is to use a teleconferencing software program, an aspect of which contains an embodiment of the present invention. By using computer network connections or modem connected phone lines, everyone can be connected via his or her computer. By using the teleconferencing software program, everyone's computer screen displays the same document. In addition to using the software program and network or modem connections, conference calling over the voice phone lines or through the software program creates a dynamic and live atmosphere where everyone can participate in the discussion and refer to the document displayed on the screen. When referring to the document, the ability to annotate the document on the computer screen becomes important. It is desirable to allow each person to use his or her own pointer to specifically point to, circle, or highlight an area of the document. Each pointer differentiated by color, pattern, shape or otherwise to indicate the person who is making the suggestion for the modification. Each person is allowed to create a line, an arrow, a circle, a highlight, to insert an object, or to create or import images. These created or imported objects can be saved in a file for later use or for documentation purposes. Furthermore, any suggestion for modification to the document can be immediately inserted and calculated by the application program with new results displayed on the screen for further discussion. In this manner, the final version of the document is prepared in a much shorter period of time and in an efficient and dynamic way.

The problem presented in this scenario and the solution provided by the present invention is in the annotation of the image on the computer screen, particularly in annotating over active application programs. It is desirable to annotate over static images or active application programs in the discussion with other users.

Typically, when running a computer application program such as a word processor, a spreadsheet program, or other types of program, the application program interacts with the computer hardware to display information on the computer screen to the user. The user, reading from the screen, inputs data or commands via input devices such as a keyboard or a mouse to have the application program do certain tasks. Usually, the application program controls and occupies the entire screen. The user has to use the application program in order to make any changes to the content of the screen.

If the application program does not allow the desired type of modification to the screen, that modification cannot be made. For example, in using a word processor such as a Disk Operation System ("DOS") version of WordPerfect word processor from WordPerfect Corporation, the user can type in lines of text but the user cannot highlight words or phrases by circling or marking it with different colors. Similarly, when running an application program in a windows-type environment such as in the environment provided by Microsoft Windows from Microsoft Corporation, the application program controls the part of the screen its window occupies. The user can only modify the content of the screen controlled by the application program in the manner allowed by the application program. For example, using a Microsoft Windows version rather than a DOS version of WordPerfect word processor in Microsoft Windows, the WordPerfect window size can be modified but the content in the WordPerfect window is still controlled by the WordPerfect word processor. Any changes to the content of the WordPerfect window must be allowed by the WordPerfect word processor. Thus, in the situation described above where multiple users wish to annotate over the screen controlled and occupied by active application programs, there is a need for a method to overlay objects on the screen over active application programs in an organized manner.

In the case of a static image, such as a bitmap image, an Object Linking & Embedding object, or a metafile object is pulled up on the screen for discussion and annotation, there is no application program running, but there is still a desire to keep the annotations separate from the actual image.

Thus, there is a need for a method to provide for virtual screen overlay in this case as well.

SUMMARY OF THE INVENTION

It is therefore an object of this invention to provide a method for organizing and accessing screen presentation to a computer display.

It is a further object of the invention to provide for a method to display annotation on top of active application programs or static images on a computer screen.

In the present invention, objects are organized according to their type and are placed in layers where the layers are stacked one on top of another and displayed on the screen. Whenever an object is created or modified and drawn to the screen, objects in layers above the newly created object are checked for overlapping and re-drawn if necessary. Thus, the objects in the top-most layer are always shown in their entirety. With this layered structure, objects can be easily organized and manipulated.

An embodiment of the present invention in the form of a computer software program, hereinafter referred to as the overlay program, will have to deal with two cases: annotating over static images or annotating over active application programs. In the case of static images, objects can be created, manipulated and placed over static images. In the case of annotating over application programs in a structured system environment such as windows-type system, after starting application programs and the overlay program, the user can switch back and forth between the application programs and the overlay program. When the overlay program has control, a screen-size, transparent window is created and objects are created in this window. This transparent window will allow the user to see the application programs on the screen. Thus, when creating objects on this window, a visual perception is created that the annotations are on the screen contents as displayed by the application programs. The transparent window is preferrable in order to allow the user full access and interaction with the underlying windows system and in interacting with the underlying computer software and hardware, just like any other application programs. When the user finishes the annotation, the user can switch back to the application programs with the option to hide the annotations or to display the annotations over the live application programs. In using the application programs, the application programs will issue commands to update the screen content. If the annotations are still on the screen, these commands are redirected to a virtual display driver. The virtual display driver will carry out the screen updates by calling the standard display driver as requested by the application programs, and it will work with the overlay program to check for overlapping of the screen updates with the displayed annotations. The annotations will be redrawn if there are overlapping areas between the annotation objects and the screen updates.

When the user again switches to the overlay program, the transparent window is again created and the objects are placed on this transparent window. New objects can be created on this window and all the objects can be fully manipulated. By this method, the user can make annotations for other users to see. At the same time, the user can update any suggested changes immediately by using the application program. Other users can comment on the revisions and suggest further changes.

The word "object" in this application collectively refers to annotation object and pointer object.

A transparent window is the preferrable method in this invention. However, other methods to create the results obtained from using a transparent window is also within the present invention.

General references of the subject matters discussed in this application can be found in reference materials such as Microsoft Windows 3.1, vol. 1-4, Mircosoft Press, 1992, and Microsoft Visual C++, Development System for Windows, Version 1.0, Microsoft Corporation, 1993.

These and other objects and advantages of the present invention will no doubt become apparent to those skilled in the art after having read the following detailed description of the preferred embodiment which is illustrated in the several figures of the drawing.

DETAILED DESCRIPTION OF THE PREFERRED EMBODIMENTS

Figure 1A:
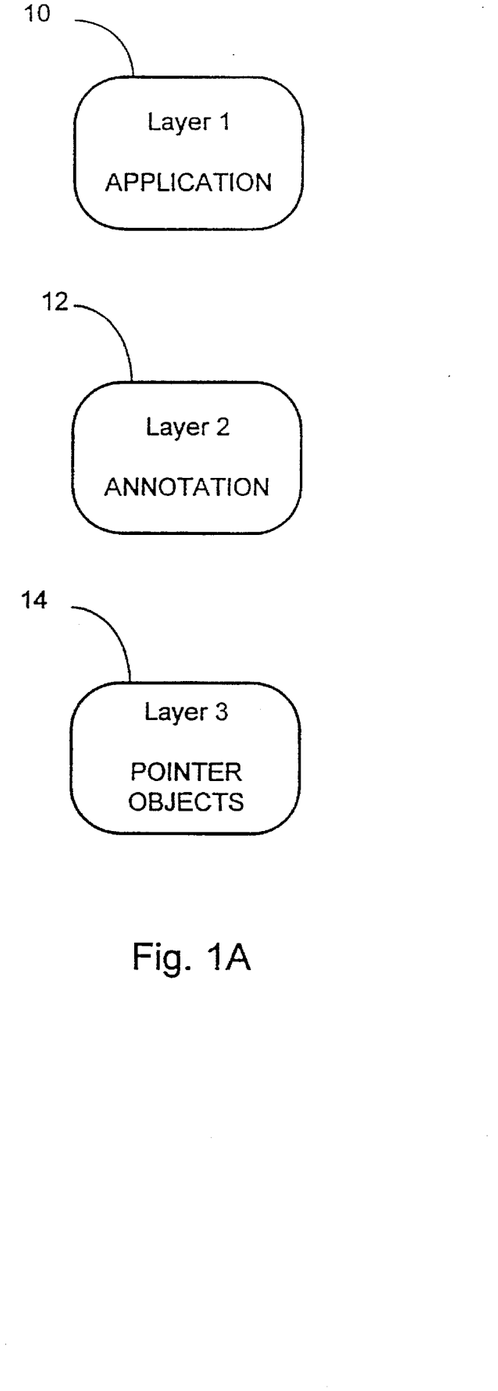
FIG. 1A is an illustration of the three layer structure used to Organize objects created or imported by the user in the preferred embodiment of the present invention.
Figure 1B:
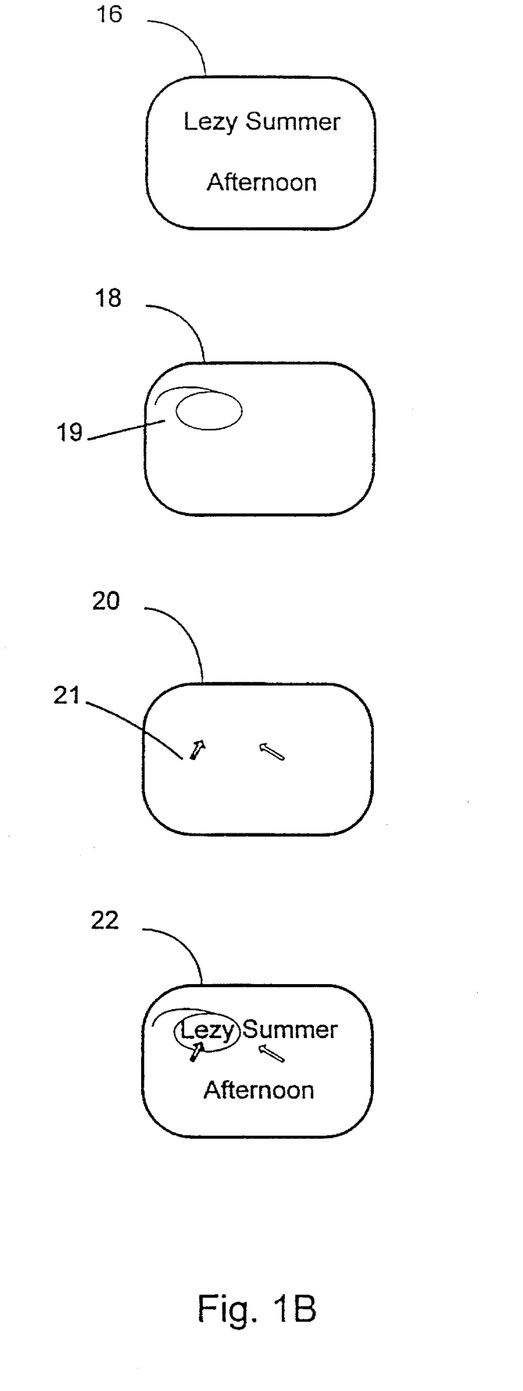
FIG. 1B is an illustration of an example of the use of the three layer structure and the final visual image displayed on the computer screen.

In the present invention, the screen is conceptually divided into several layers, with one layer on top of another layer. In the preferred embodiment, referring to FIG. 1A, there are three layers. The first layer 10 is the application program layer, the second layer 12 is the annotation object layer, and the third layer 14 is the pointer object layer. The third layer is on top of the second layer and both of these layers are on top of the first layer. In FIG. 1B, the first layer 16 shows an example of a simplified screen of a word processor and the word processor displaying lines of text, the first line of text containing a misspelled word "Lezy" when it should be "Lazy". The second layer 18 shows annotation on part of that text, circling the misspelling. The third layer 20 shows two pointers objects created to point to the document. Here, it is pointing to the misspelled word. When all three layers are stacked on top of each other, the user sees a computer screen 22 showing the lines of text with the misspelled word, the annotation over the misspelled word, and one of the pointer objects pointing to the misspelled word. By organizing the presentation of the screen display in this manner, annotations can be easily created and manipulated.

Note, although the preferred embodiment has three layers, additional layers can be easily added. One example of where an additional layer may be useful is when an outline from a lowest resolution computer monitor is displayed on a higher resolution computer monitor. Another example is where a grid is placed on the screen to assist the user in aligning objects.

Also, although the DOS system and the Microsoft Windows program are used as examples herein, it shall be understood that this invention is applicable to any computer operating system platform, including SUN/OS from Sun Corporation, OS/2 from IBM Corporation, Window NT from Microsoft Corporation, or any others. It also shall be understood that this invention can be programmed in any programming language.

Note that users may be located at different geographical locations, but every user's computer screen will display the same objects no matter who created the objects. Each user may create a pointer object or annotation objects. It is not within the scope of the present invention to discuss transference of objects from one user to other users such that each user's computer screen displays the same thing.

An embodiment of the present invention in the form of a computer software program, hereinafter referred to as the overlay program, will have to deal with two cases. In the first case, a static image such as a bit map image, a metafile vector image, O.L.E. objects, or a text based image is imported and displayed on the screen and the user annotates on top of this static image. In the second case, the user starts one or more application programs and the overlay program, and the overlay program allows annotations on top of the application programs.

I. Overlaying Static Images

Figure 2:
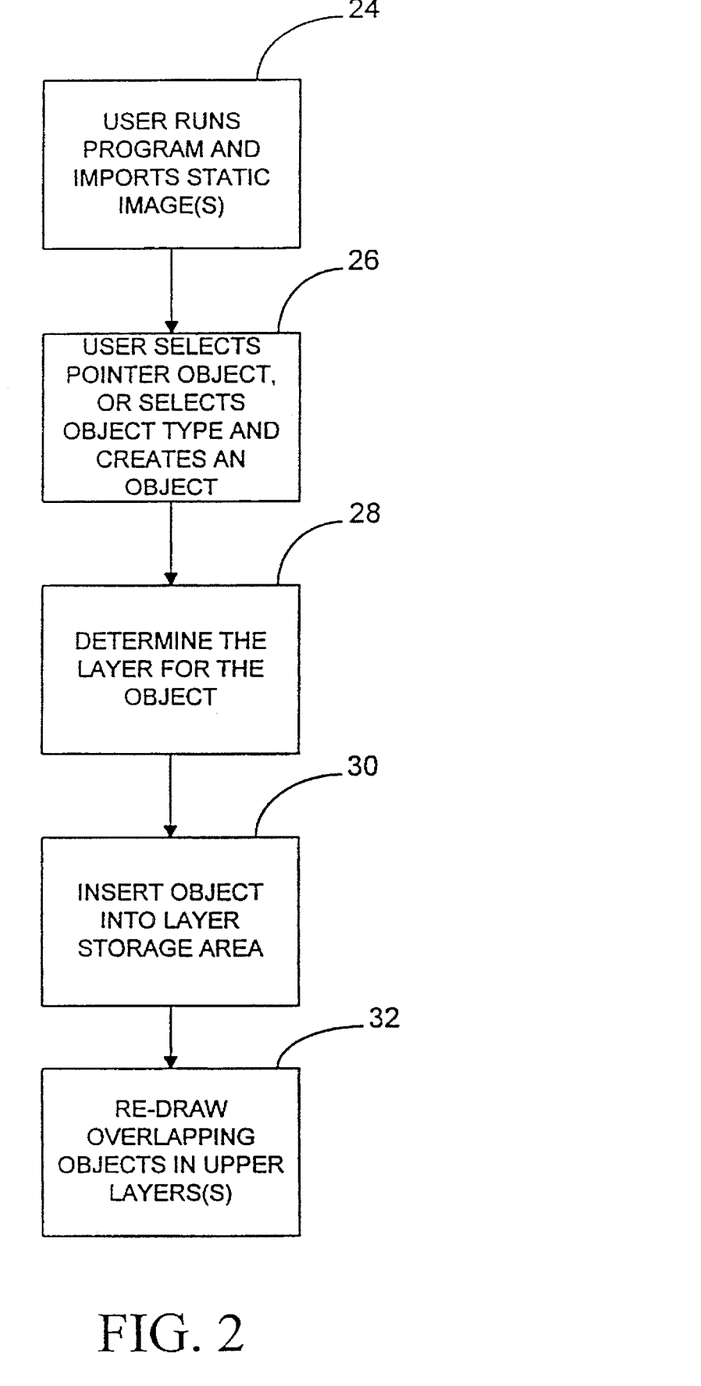
FIG. 2 shows the method steps in creating annotations or pointer objects over static images.

In the first case, referring to FIG. 2, when the user starts the overlay program, a window is created and a default object type, such as the pen type, is provided. The user can use the pen, the movement of which is controlled via the mouse, to move around the screen and click on icons. The user can click on an icon to import one or more images and display them on the screen 24. The user can create annotation objects on the images with the pen, or select another annotation object type to annotate with. The user can also select a pointer object to point to the images. Note that created annotations and pointer objects appear on every user's screen. A selected annotation object type such as the pen mentioned above only appears on that user's screen although it can be moved around as well. When the pen creates an object, that object is displayed to all the screens.

Once the image is on the screen, the user can create a pointer object to point to area of the image. By using the pointer object its movement controlled via a mouse, the user can point to different areas of the image and make his or her presentation accordingly over the phone with conference calling while other users viewing the screen listen. Other users may also create pointer objects and make presentations as well. The pointer objects can be differentiated by colors or patterns to allow listeners to identify which user is using which pointer object.

The user may create annotation objects by first selecting the annotation object type (or use the default annotation object type) to annotate over the image. Annotation object types include highlights, boxes, circles, lines, arrows, text input, and etc. Selection of annotation object type is made by the user clicking on the icon representing the desired annotation object type. Once the annotation object type is selected, the user can create an annotation by moving to the desired part of the images to annotate, click and hold down on the mouse button, drag the mouse for the desired annotation, shape or size and release the mouse button to end the annotation 26. An annotation is thus created.

When the mouse button is clicked and held down, the coordinates of the mouse movement is recorded until the mouse button is released. This recorded information represents the annotation object and is stored in the proper storage location.

Every object is assigned to a layer according to its type. The first layer includes all the imported images. The user may import and display one or more images on to the screen and these images are assigned to the first layer. The second layer includes all the annotation objects. Whether it be a highlight over a sentence or a circle over a word, all of these objects are assigned to the second layer. The third layer includes all the pointer objects. The pointer objects created by the users to point to the image is always assigned to the third layer.

Once the object is created, it is stored into the corresponding layer storage area 30. After the object is stored, any existing upper-layer objects overlapping on the screen with the just created object are re-drawn on the screen 32. For example, if a pointer object is created first and a circle annotation is created later, because the pointer object is at a higher layer than the layer for the circle annotation, the circle annotation is checked for overlapping with the pointer object. After the circle annotation is drawn to the screen, the overlapping part of the pointer object with the circle annotation, if any, will be redrawn to the screen. It shall be understood that the coordinates of any pointer objects are updated constantly. This completes the method step for a static image. The storage method and the redrawn process is described in detail below.

Figure 3:
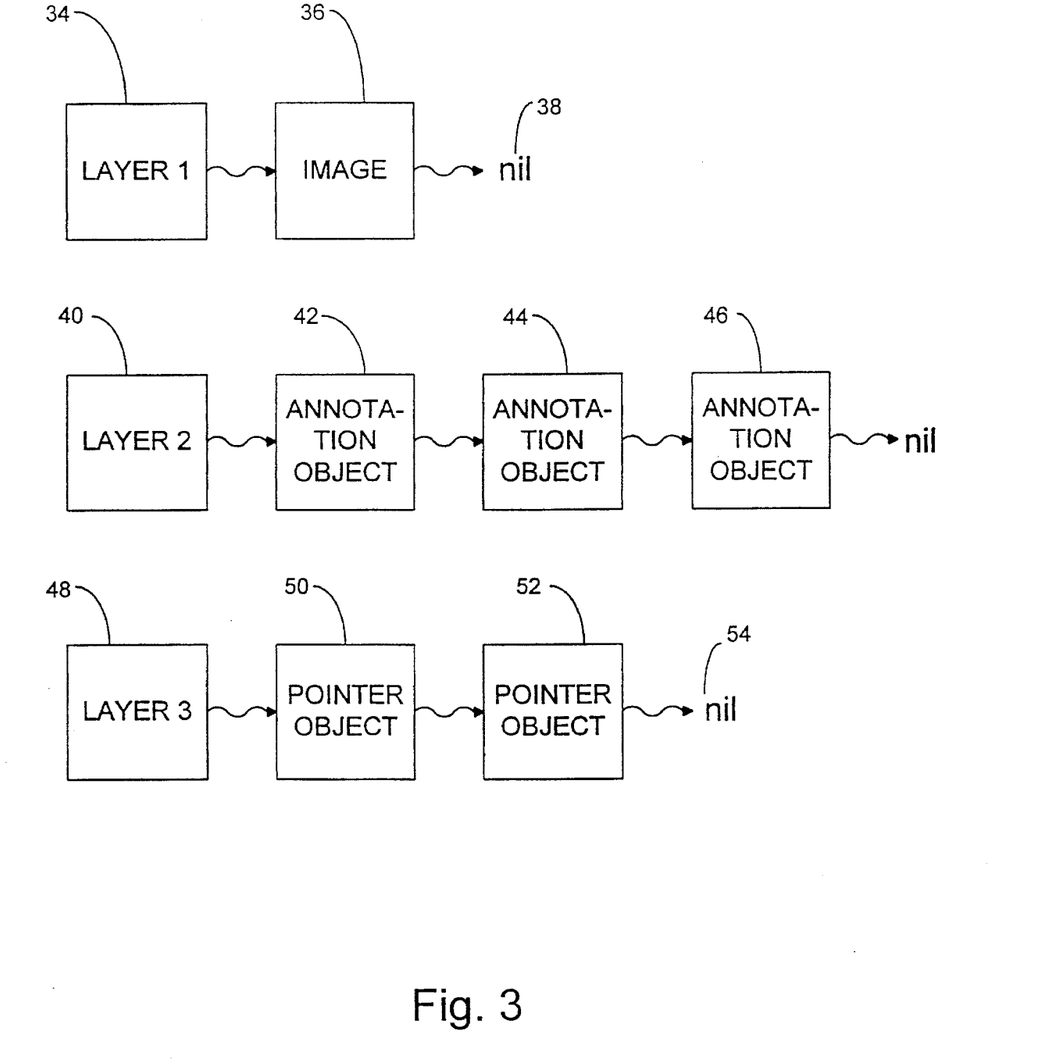
FIG. 3 illustrates an example of using link lists to store images and objects.

Referring to FIG. 3, the preferred storage method for the objects is explained. Although there are a number of ways to store data, the preferred storage method is to utilize link lists. FIG. 3 demonstrates one way of storing objects using link lists. There is a first layer pointer 34 pointing to a location 36 that contains information describing the image and information regarding a next pointer pointing to the next image, if any. In this case, there is only one image and the next pointer points to nil 38 (end of list). There is a second layer pointer 40 pointing to a location 42 that contains information describing an object and a next pointer. The next pointer here points to another location that contains information describing another object and another next pointer. This list contains three objects. Similarly, there is a third layer pointer 48 pointing to a location containing information describing a pointer object and a next pointer. Here, there are two pointer objects in this list.

For all layers, a new object or image is always inserted at the end of each layer's link list. So, a new pointer object (a third layer object) just created will be inserted between pointer object 52 and nil 54. The concept, practice, and manipulation of link lists can be found in books describing programming methods or the "C" programming language.

Once annotation objects are created, it can be individually selected and modified or erased. More specifically, a selected annotation object can be partially erased by the user selecting an eraser and clicking down and dragging the eraser over the annotation object. The annotation object can be entirely deleted or moved to a new location. In the case where a stored object is selected and modified or moved, the object can either stay in its place in the link list or be inserted at the end of the link list. The creation, selection, modification, or deletion of objects in general are commonly known in the art.

Figure 4:
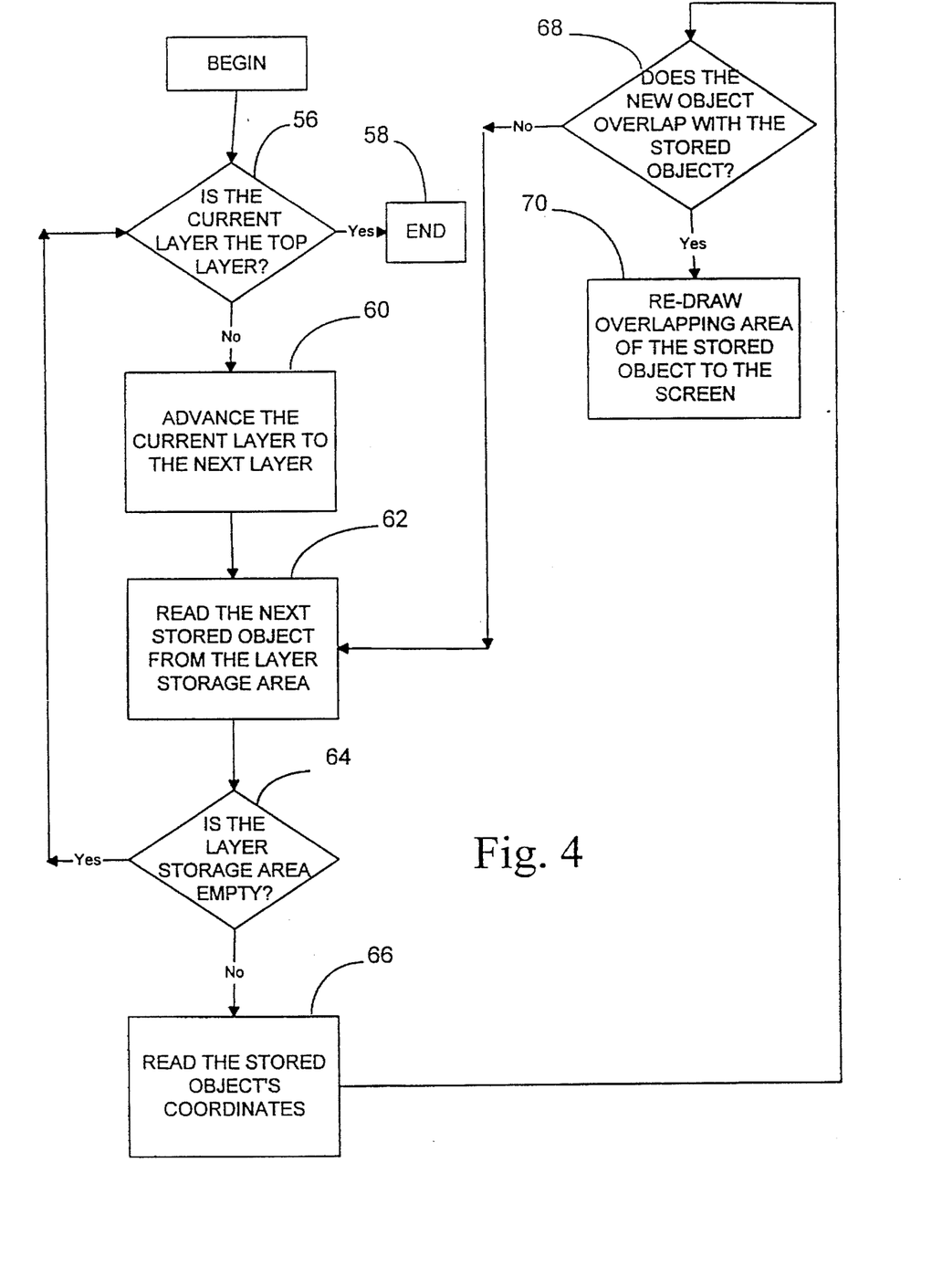
FIG. 4 shows the method steps in checking for overlapping of objects in the different layers and redrawing the overlapped object, if necessary.

Now referring to FIG. 4, the method of re-drawing overlapping objects in upper layer(s) (FIG. 2, part 32) is explained. Once the newly created object is inserted into the link list, the current layer is the layer number of the newly created object and the overlay program checks if the current layer is the top layer 56. If the current layer is the top layer, there is no layer above and this step is finished 58. If the current layer is not the top layer, the next layer becomes the current layer 60, and the content of the location pointed to by the layer pointer is read 62. The layer link list is empty when a "nil" indicator signifying the end of the link list is read, and the program flows to the top layer test 56. If the link list is not empty, the screen coordinates of the stored object is read 66 and compared with the screen coordinates of the new object 68. If there are overlapping areas, the overlapping areas of the stored object is drawn to the screen 70. Otherwise, the next object, if any, is read 62.

This process continues until all stored objects in the layer(s) above the newly created object are checked for overlapping and re-drawn if necessary. The effect of this process is that the user will see annotations in chronological order, the later marks on top of earlier marks, with pointer objects on the very top. If a stored object is selected and modified, objects on the same layer created after the selected object are checked for overlapping and redrawn if necessary. Here the current layer is the layer of the selected object, and the checking step will begin with box 62.

II. Overlaying Active Application

In this case, the user starts the overlay program and one or more application programs, and annotations can be made on the screen displayed and controlled by the application programs. In this situation, an application program such as a spread sheet program can be running a mortgage calculation and users can point to cells or annotate areas of the spread sheet for modifications or insertions. Suggestions for modifications can be immediately inserted into the spread sheet program, and the spread sheet program can recalculate the mortgage calculation with the new information and display the new results for everyone to consider. If results are not favorable, there can be another round of discussion for modification to the spread sheet.

A. Structured System Programming Environment

Figure 5A:
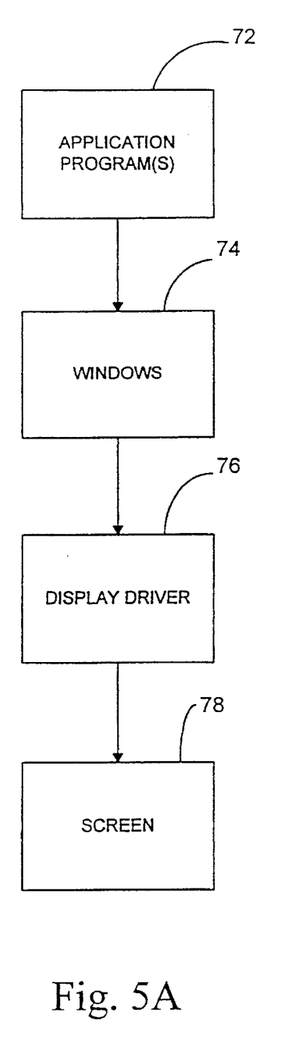
FIG. 5A shows the software layer structure in a structured system environment such as in window-type system environment.
Figure 5B:
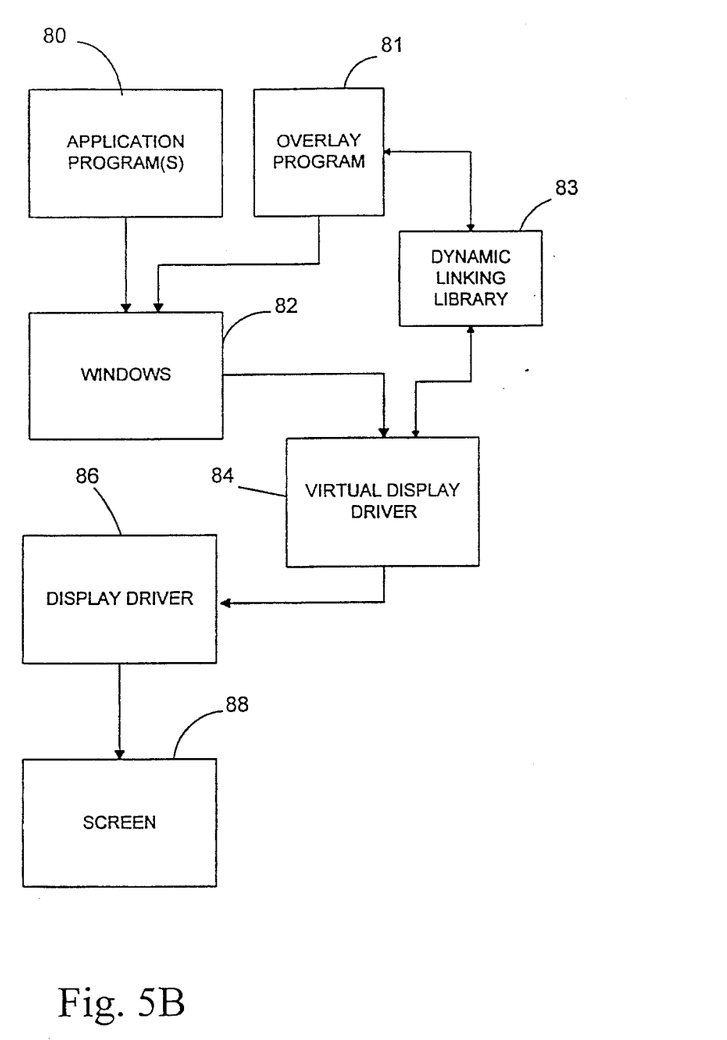
FIG. 5B shows the modification to the software layer structure when the overlay program is running in an structured system environment.

Before proceeding to the discussion of the method in overlaying active application programs, the software layers in a structured system programming environment are explained. Referring to FIG. 5A and 5B, in starting the overlay program and one or more application programs, the software layers in a structured system programming environment are modified. FIG. 5A depicts the software layers in a structured system environment such as in a windows type environment, an example of which is the Microsoft Windows program. In this environment, a running application program 72 interfaces with input and output devices strictly through the windows system environment 74. When the application program requests windows to write a character to the screen, windows in turn directs a display driver to write the character to the screen. A driver such as a display driver is a software program written specifically to handle a specific equipment or a specific type of equipment. For example, there are several standards of display resolution with computer monitors and a display driver is needed for each standard in order to control and interface with each type of monitor. The display driver tells the monitor 78 specifically how to write the character on the screen. For example, in an application program such as a word processor running on top of windows, when the user inputs a character "a" from the keyboard and when the word processor receives the character "a" as input, the word processor will display the character "a" on the screen at the right place to reassure the user that he or she has input a character "a". To write the character "a" to the screen, the word processor calls a windows write-to-screen routine, specifying the character "a" and the location on the screen to place the character. The windows routine in turn calls the display driver with the given information, and the display driver specifically tells the computer screen the placement of dots on the screen to compose the visual image resembling the character "a".

In activating the overlay program, referring to FIG. 5B, the software layer structure is modified. The windows' call to the display driver is redirected to a virtual display driver 84. The virtual display driver is part of the overall overlay program.

Redirection of the display driver to the virtual display driver is accomplished by renaming the display driver file name to a predefined file name and naming the virtual display driver to the display driver's original name. When windows calls the display driver via its name, it is calling the virtual display driver rather than the display driver. The virtual display driver will be able to call the display driver through its predefined name.

The virtual display driver calls the display driver with the information to place on the screen as requested by the word processor. In addition, the virtual display driver will report coordinates of the screen updates to the overlay program via the dynamic linking library. When the screen updates are finished, the overlay program will read the coordinates stored in the dynamic link library, check for overlapping screen objects, and re-draw the annotation objects if necessary.

More specifically, in a windows-type environment such as in Microsoft Windows, there is a message queue to place all the unprocessed tasks. When all the tasks in the queue are processed, Windows issues an idle message to all the application programs in Windows. When the overlay program receives this message, it has program control and it checks the dynamic link library. If there are coordinates of the screen updates placed there by the virtual display driver, it reads those coordinates and checks for overlapping. If there is overlapping on the annotation objects, redrawing of the screen is then necessary. Before redrawing, the overlay program first sets a flag in the dynamic link library to inform the virtual display driver not to write coordinates of the annotations to the dynamic link library. When it finishes redrawing the annotations, the overlay program resets the flag in the dynamic link library to inform the virtual display driver to start saving screen update coordinates again. This process is fully explained below in Section C.

B. Unstructured System Programming Environment

Figure 6A:
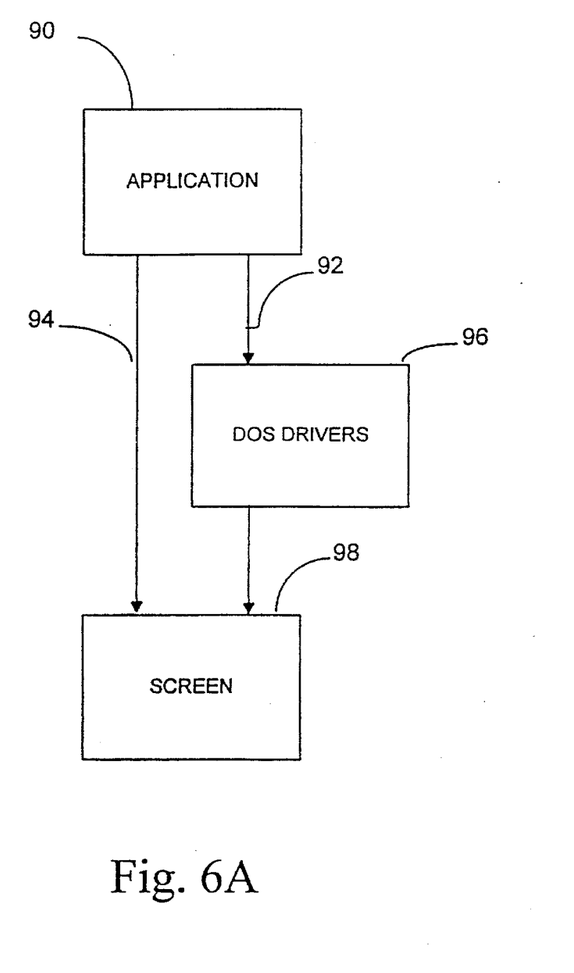
FIG. 6A shows the software layer structure in an unstructured system environment.
Figure 6B:
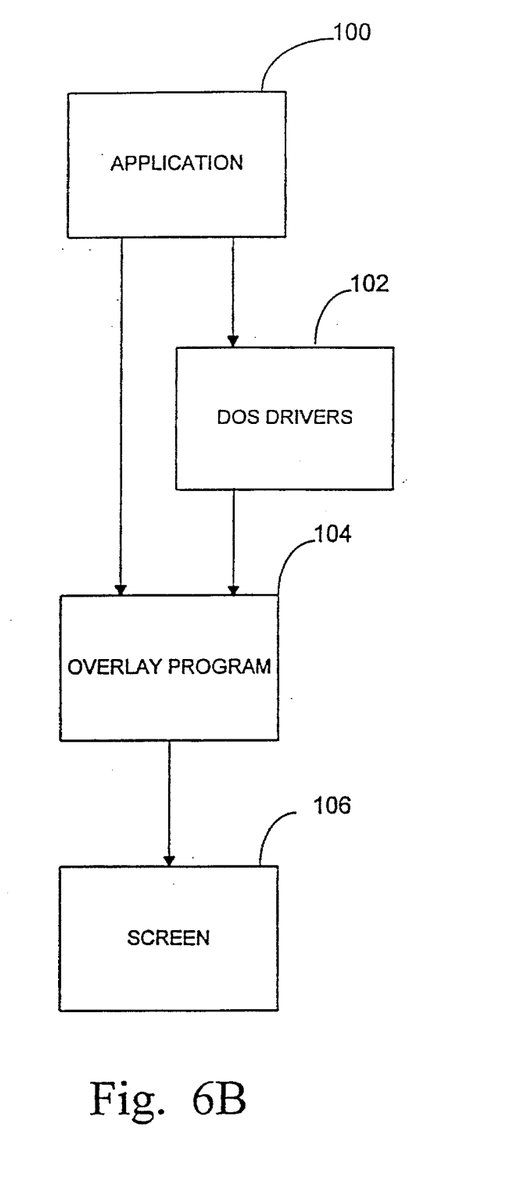
FIG. 6B shows the modification to the software layer structure when the overlay program is running under an unstructured system environment.

Referring to FIG. 6A, in an unstructured system programming environment such as usually the case under the DOS environment, in writing to the screen the application program 90 can either call a DOS screen driver 92 or write directly to the screen 94. If the application program calls a DOS screen driver 96, the DOS screen driver in turn directs the screen to display the desired image. In this environment, by activating the overlay program, referring to FIG. 6B, the overlay program 104 catches all the write commands to the screen and checks for overlapping situation and re-draws the screen if necessary, or it can update the display memory on a regular basis.

The preferred programming environment is the structured system programming environment described in section A above. Although the present invention can be implemented in an unstructured system programming environment just described, the processing speed of the resulting embodiment program may be unsatisfactory relative to the processing speed obtained from an embodiment program in a structured programming environment.

C. Annotation Over Active Application Program—Application Sharing Mode

Figure 7:
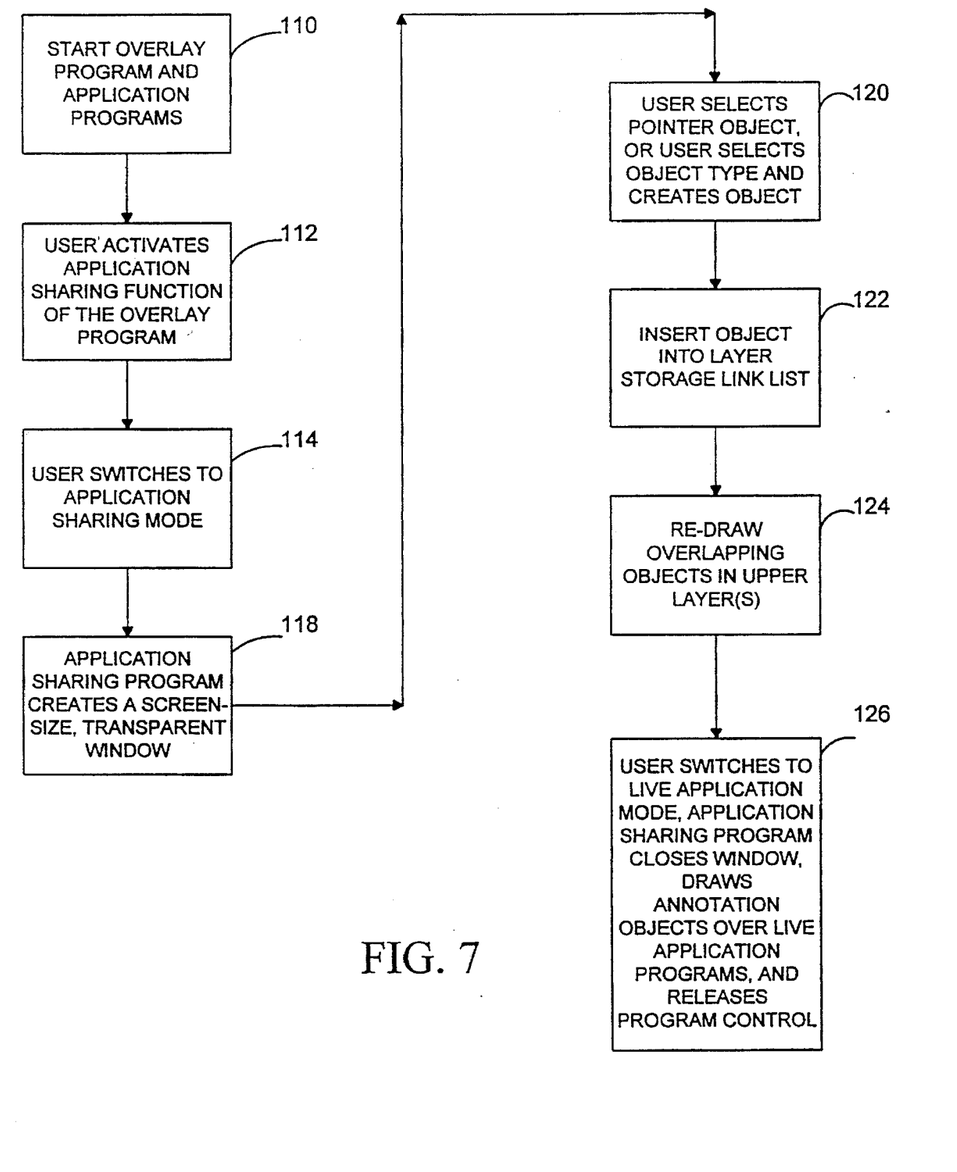
FIG. 7 illustrates the method steps in the case of annotating over application programs while in the application sharing mode.

Now referring to FIG. 7, when the user starts the overlay program, the user can work with static images or active application programs. To work with active application programs, the user must initiate the application sharing function of the overlay program 112. When the application sharing function is activated, the software layer structure is modified as described in the above sections. After the application sharing function is activated, the user is now able to switch back and forth between two modes, the live application mode and the application sharing mode. In the live application mode, the user will be able to interact with the application programs in the normal manner. In the application sharing mode, the user will be able to annotate on the screen.

In order to place annotations on top of the screen as displayed by the application programs, the user switches to the application sharing mode 114 to transfer program control to the application sharing program, which is part of the overall overlay program. The user can switch to the application sharing mode by clicking on an icon in a tool bar provided on the screen by the overlay program or by a hot-key-sequence. The preferred method is to provide a tool bar on screen, the tool bar containing several icons.

When the application sharing program is activated 116, it creates a screen-size, transparent window to overlay the entire screen 118. The transparent window exists as work space for the application sharing program. Like in the static image case, the window will provide a number of visible icons to allow the user control and use of the program, icons that allow creation of pointer objects, annotation objects, or importing of static images. Furthermore, the user has the option to capture the screen content displayed by the application programs, convert it to a bit map image, and save it in a file along with any annotations. Note that the transparent window is like any other window that may be created under a windows-type system environment. The only difference is that it has a transparent background. Under Microsoft Windows, the create-window-extended function is used.

By creating a window, the underlying windows system provides full range of support to the overlay program like any other application program running in the windows system. Typically, when a window is created, it is in the foreground and it covers up other windows. Here because a transparent window is created, the user still can see the content of the underlying application programs. At the same time, the user can create annotations over the application programs.

Once the application sharing program is activated, user interaction with the application sharing program is similar to user interaction in the static image case as described in Part I above. The user may create a pointer object 120 to move and point to various areas of the document in his or her discussion with other users. The user may also select an object type such as a highlighter and highlight part of the document for special attention or treatment 120. Objects created are stored in layer link lists 122 as described above in FIG. 3. Newly created objects are checked against stored objects in upper layers for overlapping, and overlapping areas with the stored objects are re-drawn 124, as described above in FIG. 4.

The user may switch back to the live application mode to work with the application programs and return the application sharing program to the background 126 by clicking on an icon or by using the same hot-key-sequence. At this time, the transparent window is closed, annotation objects are redrawn on the application programs, and program control returns to the application programs. The user may again use the application programs to make the necessary modification to the documents in the application programs.

If the user again switches from the application program to the overlay program, the screen-size, transparent window is again created and all the annotation objects are placed on this window for modification.

D. Application Program Writing Over Annotations—Live Application Mode

Before returning to the application programs, the user may choose to hide the annotations, or the user may choose to allow the annotations to remain on the screen. In the latter case and after program control has return to the application programs, any updates to the screen content by the application programs may overwrite the annotations. Thus, any screen updates by the application programs must be monitored and if the screen updates overwrite the annotations, the overwritten part of the annotations must be re-drawn.

Figure 8:
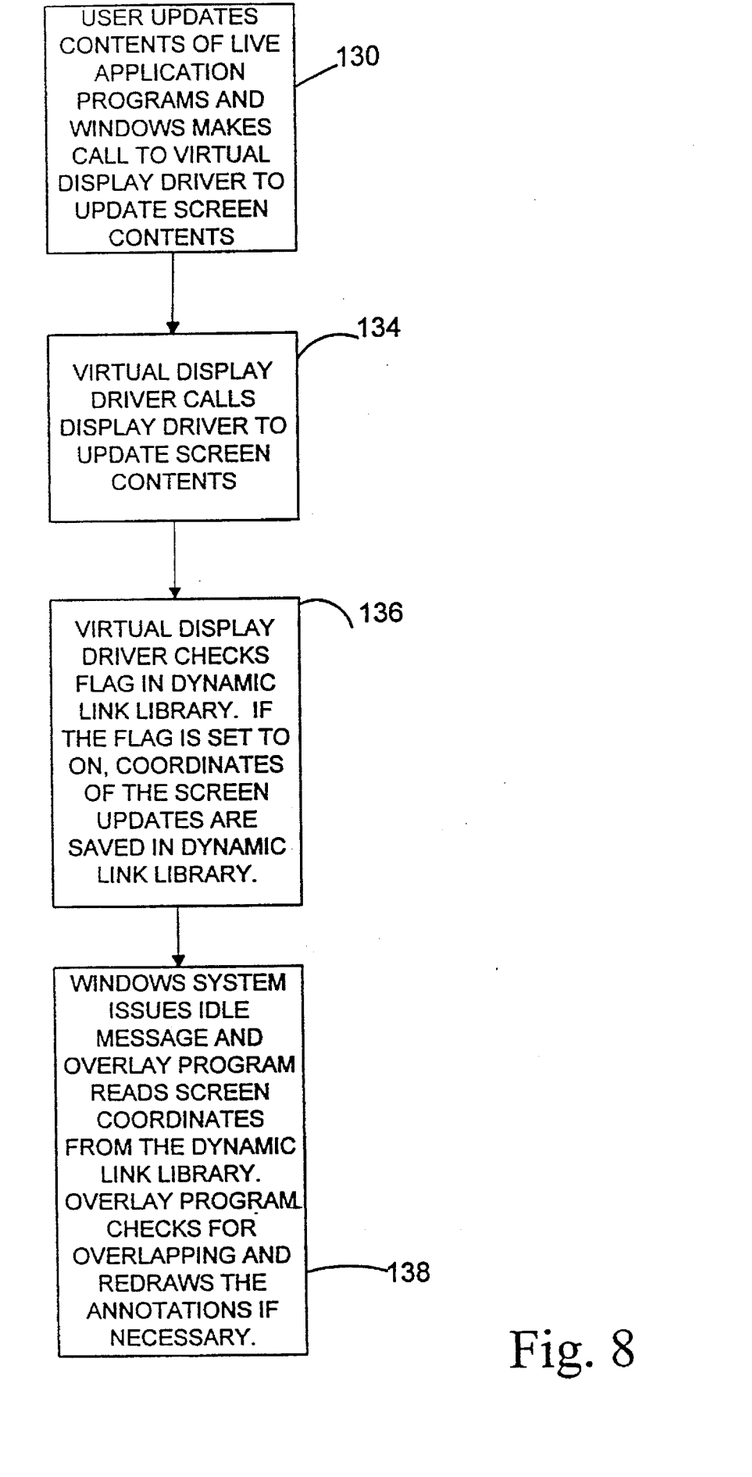
FIG. 8 illustrates the method steps in the case of annotating over application programs while in the live application mode.

Referring to FIG. 8, when writing to the screen, as mentioned above in Sections A and B, the application program calls windows' write-to-screen routine and provides information regarding the item to be written and the placement of the item on the screen. The windows system with its calls redirected, instead of calling the display driver, now calls the virtual display driver 130. The virtual display driver now having program control calls the display driver to write the updates to the screen 134. Then, the virtual display driver checks if the overlay program is doing the screen updates by checking a flag in the dynamic link library. If the flag is set to "off" which indicates that the overlay program is doing the screen updates, the overlay program must be redrawing the annotations to the screen and there is no need for the virtual display driver to store coordinates of the screen updates to the dynamic link library. If the flag is set to "on" which indicates that the overlay program is not doing the screen updates, the virtual display driver stores the coordinates of the screen updates to the dynamic link library 136. When the application programs cease updating the screen, the overlay program then redraws the screen. The overlay program will know when the screen updates are finished because windows system sends every application program an "idle" message when the windows system message queue is empty 138. When the overlay program receives this message, it checks the dynamic link library to see if any screen updates were made by the application programs. If there were screen updates made, the overlay program checks for overlapping between the screen updates and the annotations, and redraws the screen if necessary. Before redrawing the screen, the overlay program sets the flag in the dynamic link library to off so the virtual display driver can determine that the overlay program is redrawing the screen and there is no need to store the coordinates. When the overlay program finishes redrawing, the flag is set to on to inform the virtual display driver to save screen coordinates of the screen updates again.

Another method to check for overlapping and to redraw annotations is to have the virtual display driver directly do all of the checking and redrawing. The drawback with this method is that the virtual display driver has to check every screen update it receives, rather than a wholesale method as described above.

The method used to check for overlapping is the same as described above and depicted in FIG. 4 with the current layer initially set to 1. If there is any overlapping between the screen updates and the stored objects, the overlapping areas with the objects are redrawn. When all the objects have been checked, program control is returned to windows and the application program 138.

Note that in this manner, the overlay program can always display a tool bar containing icons (or any other information) on the screen for the user to use, even when the application program has apparent program control. Some of the functions provided by the tools bar icons include switching to application sharing mode, quitting application sharing, or clearing annotation off the screen.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. In a computer system, a method for displaying user-created objects over images on a computer screen to simulate annotations and pointers over said images by one or more users, wherein said images are generated, controlled, and manipulated by one or more active application programs and the user-created objects include annotation objects and pointer objects where the annotation objects and pointer object for a particular user is of a particular color wherein an annotation object highlights a part of said images and a pointer objects directs to an area of said images, comprising the steps of:

a) creating a transparent window appearing to be displayed over said images, said transparent window providing an environment for creation, manipulation, and deletion of user-created objects;
   b) creating and displaying one or more of said user-created objects at user specified locations in said transparent window and storing data representing said user-created objects;
   c) determining any overlapping portion of said user-created objects and displaying said overlapping portion of said user-created objects according to a predetermined hierarchy;
   d) repeating step b and c until a first user command to close said transparent window is received; and
   e) responding to said first user command by closing said transparent window and returning to said application programs.

2. A method as recited in claim 1 wherein before step e) data representing said images and said user-created objects is transmitted to at least one remote computer having a computer screen, said images and said user-created objects being displayed on the computer screen of said remote computer in the same fashion as in said computer system.

3. A method as recited in claim 2 and further including the step of:

retrieving the stored data and redrawing the user-created objects over the images generated by the application programs after said transparent window is closed.

4. A method as recited in claim 3, wherein a second user command to remove said user-created objects from the screen is provided after returning to said application programs, and further including a step of removing all said user-created objects from the screen upon activation of said second user command.

5. A method as recited in claim 4, wherein after returning to said application programs, the following steps are implemented:

retrieving the stored data and using it to display said user-created objects over the images generated by the application programs;
   capturing write-to-screen commands and write-to-screen data issued by the application programs and displaying the write-to-screen data on the computer screen;
   determining any overlap of the write-to-screen data and said user-created objects; and
   if there is overlap of the write-to-screen data and said user-created objects, redrawing the overlapping portion of said user-created objects on the computer screen.

6. A method as recited in claim 5, wherein said user-created objects include pointer objects and annotation objects.

7. A method as recited in claim 6, wherein said images are stored in a first layer storage area, said annotation objects are stored in a second layer storage area, said pointer objects are stored in a third layer storage area, wherein the pointer objects are displayed over the annotation objects and the images, wherein the annotation objects are displayed over the images, and wherein said overlap determination step includes the sub-steps of:

i) ascertaining said user-created object type and the associated layer storage area for said user-created object type;
   ii) setting a current-layer-pointer to point to the associated layer storage area;
   iii) if the current-layer-pointer is not pointing to the third layer storage area,
      advancing the current-layer-pointer to point to the next layer storage area;
      searching for objects stored in the layer storage area pointed to by the current-layer-pointer;
      determining if the stored objects and the user-created object occupy the same location on the screen; and
      drawing any overlapping portion of the stored objects on the computer screen; and
   iv) repeating step ii) until the current layer pointer points to the third layer storage area.

8. A method as recited in claim 1 and further including the step of:

retrieving the stored data and redrawing the user-created objects over the images generated by the application programs after said transparent window is closed.

9. A method as recited in claim 1, wherein a second user command to remove said user-created objects from the screen is provided after returning to said application programs, and further including a step of removing all said user-created objects from the screen upon activation of said second user command.

10. A method as recited in claim 1, wherein after returning to said application programs, the following steps are implemented:

retrieving the stored data and using it to display said user-created objects over the images generated by the application programs;
   capturing write-to-screen commands and write-to-screen data issued by the application programs and displaying the write-to-screen data on the computer screen;
   determining any overlap of the write-to-screen data and said user-created objects; and
   if there is overlap of the write-to-screen data and said user-created objects, redrawing the overlapping portion of said user-created objects on the computer screen.

11. A method as recited in claim 1, wherein said user-created objects include pointer object type and annotation object type.

12. A method as recited in claim 11, wherein said images are stored in a first layer storage area, said annotation objects are stored in a second layer storage area, said pointer objects are stored in a third layer storage area, wherein the pointer objects are displayed over the annotation objects and the images, wherein the annotation objects are displayed over the images, and wherein said overlap determination step includes the sub-steps of:

i) ascertaining said user-created object type and the associated layer storage area for said user-created object type;
   ii) setting a current-layer-pointer to point to the associated layer storage area;

iii) if the current-layer-pointer is not pointing to the third layer storage area,
    advancing the current-layer-pointer to point to the next layer storage area;
    searching for objects stored in the layer storage area pointed to by the current-layer-pointer;
    determining if the stored objects and the user-created object occupy the same location on the screen; and
    drawing any overlapping portion of the stored objects on the computer screen; and iv) repeating step ii) until the current layer pointer points to the third layer storage area.

13. In a teleconferencing system providing an environment on a host computer wherein at least one remote computer at a different site can be electronically and communicative linked to pass data between said remote computer and said host computer, and including means for establishing at least one communication link between said host computer and said remote computer, user-interface means responsive to user commands for loading previously created frames of data for transmission to the remote computer and for allowing user creation of new frames of data, means for transmitting said frames of data from the host computer to said remote computer via said communication link, an improved control means for controlling said user-interface means, said improved control means implementing a method comprising the steps of:

a) creating a transparent window appearing to be displayed over said images, said transparent window providing an environment for creation, manipulation, and deletion of one or more user-created objects;
    b) creating and displaying one or more of said user-created objects at user specified locations in said transparent window and storing data representing said user-created objects;
    c) determining any overlapping portion of said user-created objects and displaying said overlapping portion of said user-created objects according to a predetermined hierarchy;
    d) repeating step b and c until a first user command to close said transparent window is received; and
    e) responding to said first user command by closing said transparent window and returning to said application programs.

14. In a system as recited in claim 13 wherein before step e) data representing said images and said user-created objects is transmitted to at least one remote computer having a computer screen, said images and said user-created objects being displayed on the computer screen of said remote computer in the same fashion as in said computer system.

15. In a system as recited in claim 14 and further including the step of:
    retrieving the stored data and redrawing the user-created objects over the images generated by the application programs after said transparent window is closed.

16. In a system as recited in claim 15, wherein a second user command to remove said user-created objects from the screen is provided after returning to said application programs, and further including a step of removing all said user-created objects from the screen upon activation of said second user command.

17. In a system as recited in claim 16, wherein after returning to said application programs, the following steps are implemented:
    retrieving the stored data and using it to display said user-created objects over the images generated by the application programs;
    capturing write-to-screen commands and write-to-screen data issued by the application programs and displaying the write-to-screen data on the computer screen;
    determining any overlap of the write-to-screen data and said user-created objects; and
    if there is overlap of the write-to-screen data and said user-created objects, redrawing the overlapping portion of said user-created objects on the computer screen.

18. In a system as recited in claim 17, wherein said user-created objects include pointer objects and annotation objects.

19. In a system as recited in claim 18, wherein said images are stored in a first layer storage area, said annotation objects are stored in a second layer storage area, said pointer objects are stored in a third layer storage area, wherein the pointer objects are displayed over the annotation objects and the images, wherein the annotation objects are displayed over the images, and wherein said overlap determination step includes the sub-steps of:

i) ascertaining said user-created object type and the associated layer storage area for said user-created object type;
    ii) setting a current-layer-pointer to point to the associated layer storage area;
    iii) if the current-layer-pointer is not pointing to the third layer storage area,
        advancing the current-layer-pointer to point to the next layer storage area;
        searching for objects stored in the layer storage area pointed to by the current-layer-pointer;
        determining if the stored objects and the user-created object occupy the same location on the screen; and
        drawing any overlapping portion of the stored objects on the computer screen; and
    iv) repeating step ii) until the current layer pointer points to the third layer storage area.

20. In a system as recited in claim 13 and further including the step of:
    retrieving the stored data and redrawing the user-created objects over the images generated by the application programs after said transparent window is closed.

21. In a system as recited in claim 13, wherein a second user command to remove said user-created objects from the screen is provided after returning to said application programs, and further including a step of removing all said user-created objects from the screen upon activation of said second user command.

22. In a system as recited in claim 13, wherein after returning to said application programs, the following steps are implemented:
    retrieving the stored data and using it to display said user-created objects over the images generated by the application programs;
    capturing write-to-screen commands and write-to-screen data issued by the application programs and displaying the write-to-screen data on the computer screen;
    determining any overlap of the write-to-screen data and said user-created objects; and
    if there is overlap of the write-to-screen data and said user-created objects, redrawing the overlapping portion of said user-created objects on the computer screen.

23. A system as recited in claim 13, wherein said user-created objects include pointer object type and annotation object type.

24. In a system as recited in claim 23, wherein said images are stored in a first layer storage area, said annotation objects are stored in a second layer storage area, said pointer objects are stored in a third layer storage area, wherein the pointer objects are displayed over the annotation objects and the images, wherein the annotation objects are displayed over the images, and wherein said overlap determination step includes the sub-steps of:

i) ascertaining said user-created object type and the associated layer storage area for said user-created object type;

ii) setting a current-layer-pointer to point to the associated layer storage area;

iii) if the current-layer-pointer is not pointing to the third layer storage area, advancing the current-layer-pointer to point to the next layer storage area;

searching for objects stored in the layer storage area pointed to by the current-layer-pointer;

determining if the stored objects and the user-created object occupy the same location on the screen; and drawing any overlapping portion of the stored objects on the computer screen; and iv) repeating step ii) until the current layer pointer points to the third layer storage area.

* * * * *